United States Patent
Takeuchi et al.

(10) Patent No.: US 9,731,636 B1
(45) Date of Patent: Aug. 15, 2017

(54) VEHICLE SEAT

(71) Applicants: TS TECH CO., LTD., Asaka-shi, Saitama (JP); HONDA MOTOR CO., LTD., Minato-ku, Tokyo (JP)

(72) Inventors: Taiki Takeuchi, Asaka (JP); Jeremy Ruff, Reynoldsburg, OH (US); Sean T. Collins, Raymond, OH (US); Robley A. Mangold, Raymond, OH (US); Masakazu Okada, Raymond, OH (US); Raju Bethina, Raymond, OH (US)

(73) Assignees: HONDA MOTOR CO., LTD., Tokyo (JP); TS TECH CO., LTD., Saitama (JP)

(*) Notice: Subject to any disclaimer, the term of this patent is extended or adjusted under 35 U.S.C. 154(b) by 0 days.

(21) Appl. No.: 15/141,455

(22) Filed: Apr. 28, 2016

(51) Int. Cl.
*B60N 2/44* (2006.01)
*B60N 2/68* (2006.01)
*B60N 2/30* (2006.01)
*B60N 2/56* (2006.01)

(52) U.S. Cl.
CPC ............ *B60N 2/442* (2013.01); *B60N 2/3011* (2013.01); *B60N 2/5678* (2013.01); *B60N 2/68* (2013.01); *B60N 2002/4425* (2013.01)

(58) Field of Classification Search
CPC ........ B60N 2/5678; B60N 2/442; B60N 2/68; B60N 2/3011
USPC ............. 297/217.3, 378.1, 337, 463.1, 463.2
See application file for complete search history.

(56) References Cited

U.S. PATENT DOCUMENTS

| | | | | |
|---|---|---|---|---|
| 4,728,068 A | * | 3/1988 | Rivkin | F16B 21/088 24/297 |
| 4,832,403 A | * | 5/1989 | Tomita | B60N 2/0296 297/330 |
| 5,292,178 A | * | 3/1994 | Loose | B60N 2/0232 297/337 |
| 5,538,210 A | * | 7/1996 | Ohmori | F16L 3/04 248/222.12 |
| 6,120,327 A | * | 9/2000 | O'Brien | B29C 44/12 174/72 A |
| 7,188,815 B2 | * | 3/2007 | Peterson | F16B 21/088 24/297 |
| 7,854,413 B2 | * | 12/2010 | Yamamoto | F16L 3/015 174/72 A |

(Continued)

FOREIGN PATENT DOCUMENTS

| | | |
|---|---|---|
| JP | 10-248681 A | 9/1998 |
| JP | 2010-40186 A | 2/2010 |
| JP | 2012-131248 A | 7/2012 |

*Primary Examiner* — David R Dunn
(74) *Attorney, Agent, or Firm* — Hamre, Schumann, Mueller & Larson, P.C.

(57) ABSTRACT

In a vehicle seat including a first member and a second member allowed to turn relative to the first member to thereby shift between a first state in which the second member faces the first member and a second state in which the second member is farther from the first member than in the first state, a first electric device is provided in the first member, a second electric device is provided in the second member, a first electric wire is connected to the first electric device, a second electric wire is connected to the second electric device, and a tying part is provided which ties the first electric wire and the second electric wire together into a bundle. The tying part is fixed to the first member.

10 Claims, 8 Drawing Sheets

(56) References Cited

U.S. PATENT DOCUMENTS

| | | | | |
|---|---|---|---|---|
| 7,997,656 B2* | 8/2011 | Inagaki | ............... | B60N 2/0224 297/217.3 |
| 8,353,561 B2* | 1/2013 | Yamazaki | ................ | B60N 2/44 297/452.38 |
| 8,628,048 B2* | 1/2014 | Matsushima | ....... | B60R 16/0215 248/71 |
| 2002/0050730 A1* | 5/2002 | Kondo | ................... | B60N 2/002 297/217.3 |
| 2006/0066144 A1* | 3/2006 | Tsujibayashi | ...... | B60N 2/01583 297/378.14 |
| 2006/0097560 A1* | 5/2006 | Keyser | .................. | B60N 2/305 297/378.12 |
| 2007/0188007 A1* | 8/2007 | Lazanja | ............... | B60N 2/5635 297/452.42 |
| 2008/0238159 A1* | 10/2008 | Parnis | .................. | B60N 2/5685 297/180.12 |
| 2010/0072772 A1* | 3/2010 | Gamache | ............. | B60N 2/0232 296/65.08 |
| 2010/0314920 A1* | 12/2010 | Arata | ........................ | B60N 2/36 297/217.3 |
| 2011/0109133 A1* | 5/2011 | Galbreath | ............. | A47C 7/748 297/217.3 |
| 2014/0159447 A1* | 6/2014 | Saitou | ..................... | B60N 2/70 297/217.3 |
| 2015/0308477 A1* | 10/2015 | Arashi | ................ | B60N 2/7041 297/463.1 |

* cited by examiner

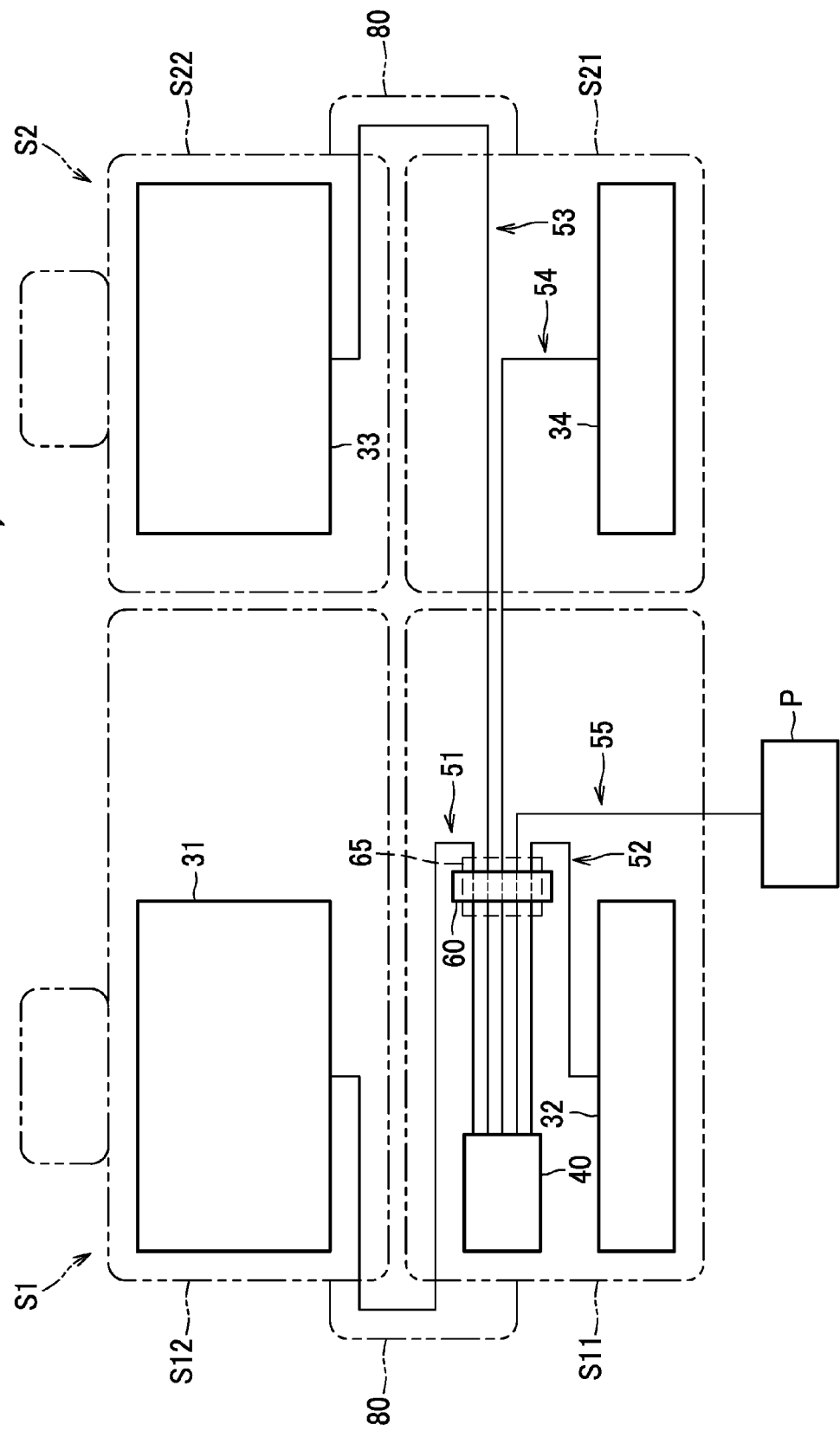

VEHICLE SEAT

BACKGROUND

1. Field

Apparatuses disclosed herein relate to a vehicle seat comprising a plurality of electric devices and electric wires connected to the electric devices.

2. Description of the Related Art

A vehicle seat, such as a seat for an automobile, typically includes a seat cushion and a seat back. A heater that generates heat upon energization may be provided in each of the seat cushion and the seat back as disclosed for example in JP 2010-040186 A.

On the other hand, a vehicle seat may be configured to include a first member and a second member such that the second member is allowed to move or turn relative to the first member. For example, in one configuration, the seat cushion may be tipped up by raising its front end relative to the seat back; in another configuration, the seat back may be folded down by tilting it forward relative to the seat cushion. Provision of heaters or other electric devices in the first member and the second member of such a vehicle seat of transformable configuration could conceivably cause problems in arrangement of electric wires connected to the electric devices. Published technical papers are silent about such problems.

SUMMARY

In one aspect, a vehicle seat in which a second member is allowed to move relative to a first member and in which electric wires can be arranged in a desirable manner is disclosed herein.

More specifically, a vehicle seat proposed according to one or more embodiments comprises a first member, a second member, a first electric device, a second electric device, a first electric wire, a second electric wire, and a tying part. The second member is allowed to turn relative to the first member to thereby shift between a first state in which the second member faces the first member and a second state in which the second member is farther from the first member than in the first state. The first electric device is provided in the first member. The second electric device is provided in the second member. The first electric wire is connected to the first electric device. The second electric wire is connected to the second electric device. The tying part ties the first electric wire and the second electric wire together into a bundle. The tying part is fixed to the first member.

Additionally, the vehicle seat configured as described above may further comprise a power supply cable arranged to supply the first electric device and the second electric device with electric power, wherein the power supply cable is tied together with the first electric wire and the second electric wire by the tying part in the bundle from which the power supply cable extends out and is connected to a power source provided in a vehicle body.

The above-described vehicle seat, with or without the additional features mentioned above, may further comprise a control unit configured to control the first electric device and the second electric device. The control unit to which the first electric wire and the second electric wire extending out from the bundle are connected may, preferably but not necessarily, be fixed to the first member.

In one or more illustrative, non-limiting embodiments, the above-described vehicle seat, with or without any of the additional features mentioned above, may further comprise a first seat, a second seat, a third electric device, a fourth electric device, a third electric wire, a fourth electric wire, and a sheath. The first seat and the second seat are arranged side by side. The first seat comprises the aforementioned first member and the aforementioned second member. The third electric device is provided in the second seat, and the fourth electric device is provided in the second seat. The third electric wire is connected to the third electric device, and the fourth electric wire is connected to the fourth electric device. The third electric wire and the fourth electric wire are tied together with the first electric wire and the second electric wire by the tying part. Portions of the third electric wire and the fourth electric wire extending out from the bundle toward the second seat are enclosed with the sheath.

The above-described vehicle seat, with or without any of the additional features mentioned above, may further comprise a first frame provided in the first member, and a bracket to which the tying part is fixed, wherein the bracket is attached to the first frame.

The above-described vehicle seat, with or without any of the additional features mentioned above, may further comprise a cover member that includes a cover body configured to cover a shaft on which the second member is allowed to turn relative to the first member, wherein at least one of the first electric wire and the second electric wire is partially laid on an inside of the cover body. The cover member may, preferably but not necessarily, further include a protective portion protruding out from the cover body and extending along a portion of the at least one of the first electric wire and the second electric wire extending out from the cover body.

In the above-describe vehicle seat with the protective portion features provided in the cover member, the protective portion may, preferably but not necessarily, be shaped to partially surround a peripheral surface of the aforementioned portion of the at least one of the first electric wire and the second electric wire such that the protective portion has an open side at an edge of the cover member in cross section taken along a plane perpendicular to a direction in which the protective portion protrudes out. The protective portion may include a projection projecting from one end portion of the open side toward another end portion of the open side.

The above-described vehicle seat with or without any of the additional features mentioned above may be configured such that the first member includes a seat back, and the second member includes a seat cushion that is available for seating purpose in the second state and is tipped up in the first state.

The above-described vehicle seat with or without any of the additional features mentioned may be configured such that the first member includes a seat cushion, and the second member includes a seat back that is available for leaning purpose in the second state and is forwardly folded down in the first state.

BRIEF DESCRIPTION OF THE DRAWINGS

The above and other aspects, other advantages and further features of the present invention will become more apparent by describing in detail illustrative, non-limiting embodiments thereof with reference to the accompanying drawings, in which:

FIG. 8 is a schematic diagram showing the electric wiring in the second embodiment.

DESCRIPTION OF THE EMBODIMENTS

A description will now be given of a first embodiment of a vehicle seat with reference to the drawings.

A car seat S as an example of a vehicle seat according to the first embodiment is illustrated in FIG. 1. The car seat S includes a first seat S1 and a second seat S2 arranged side by side (laterally). In the following description, the terms front and rear, left and right (lateral), upper (upward) and lower (downward) are used to designate the relevant directions with respect to the viewpoint of an occupant seated on the car seat S.

The first seat S1 mainly includes a seat cushion S11 as an example of a second member, a seat back S12 as an example of a first member, and headrests S13, S14. The second seat S2 mainly includes a seat cushion S21, a seat back S22, and a headrest S23.

In the present embodiment, the seat backs S12, S22 are integrally provided in one piece, and incorporate a seat back frame 10 (see FIG. 2) which constitutes a frame of the seat backs S12, S22. The seat backs S12, S22 are formed by upholstering the seat back frame 10 with a cushion pad made of a cushiony material such as urethane foam, and an outer covering made of synthetic leather, fabric or the like.

The seat cushions S11 incorporates a left seat cushion frame (not shown) which constitutes a frame of the seat cushion S11. The seat cushion S11 is formed by upholstering the left seat cushion frame with a cushion pad made of a cushiony material such as urethane foam, and an outer covering made of synthetic leather, fabric or the like. Similarly, the seat cushion S21 incorporates a right seat cushion frame (not shown) which constitutes a frame of the seat cushion S21. The seat cushion S21 is formed by upholstering the right seat cushion frame with a cushion pad made of a cushiony material such as urethane foam, and an outer covering made of synthetic leather, fabric or the like.

Figure 1A:
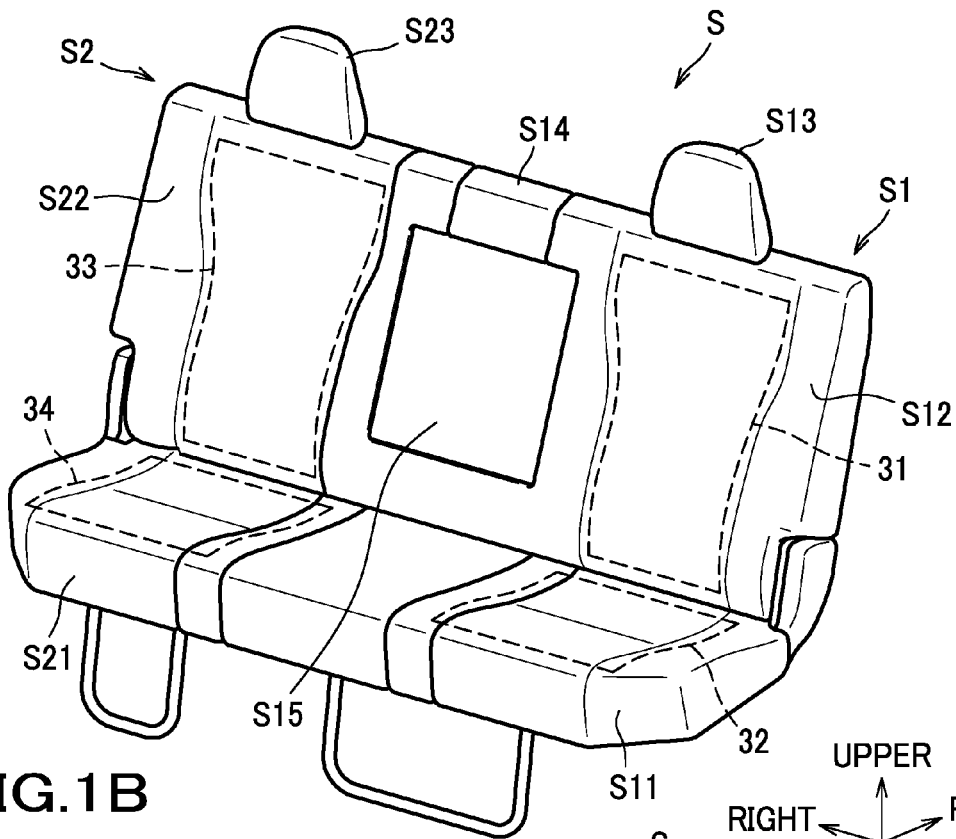
FIG. 1A is a perspective view of a vehicle seat according to a first embodiment.
Figure 1B:
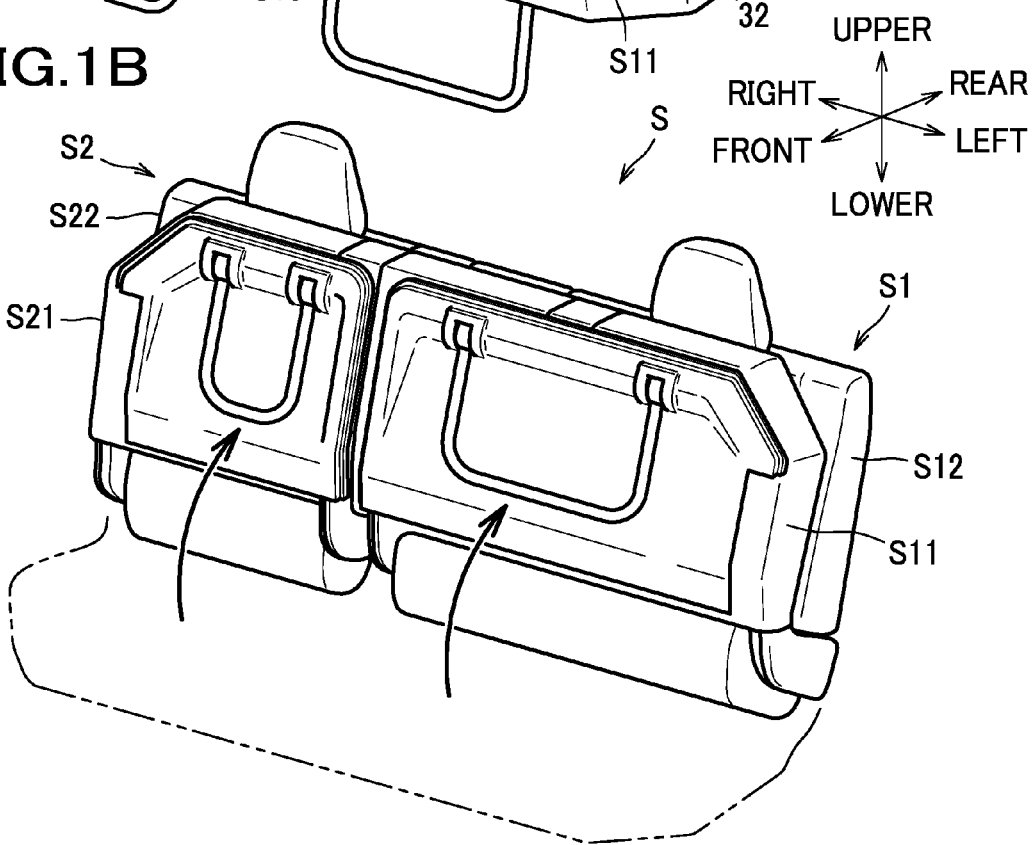
FIG. 1B is a perspective view of the vehicle seat of FIG. 1A in a state where a seat cushion has been turned and tipped up relative to a seat back.

The car seat S is configured to allow the seat cushion S11 to shift between a first state as shown in FIG. 1B in which an occupant-sitting surface thereof faces a supporting surface that is a front surface of the seat back S12 and a second state as shown in FIG. 1A in which the seat cushion S11 is farther from the seat back S12 than in the first state as a result of a turning motion thereof made relative to the seat back S12. To be more specific, the seat cushion S11 is available for seating purpose (i.e., a passenger can sit on the upper surface of the seat cushion S11) in the second state as shown in FIG. 1A, and is tipped up (turned relative to the seat back S12) in the first state as shown in FIG. 1B. Similarly, the seat cushion S21 is available for seating purpose in the state as shown in FIG. 1A, and is tipped up (turned relative to the seat back S22) in the state as shown in FIG. 1B.

A left back heater 31 as an example of a first electric device is provided in the seat back S12, and a left cushion heater 32 as an example of a second electric device is provided in the seat cushion S11. Similarly, a right back heater 33 as an example of a third electric device is provided in the seat back S22, and a right cushion heater 34 as an example of a fourth electric device is provided in the seat cushion S21. These heaters 31-34 are each configured as a sheet-type heater that generates heat upon energization, and disposed between the cushion pad and the outer covering in a position corresponding to the occupant-sitting surface or the supporting surface.

Figure 2:
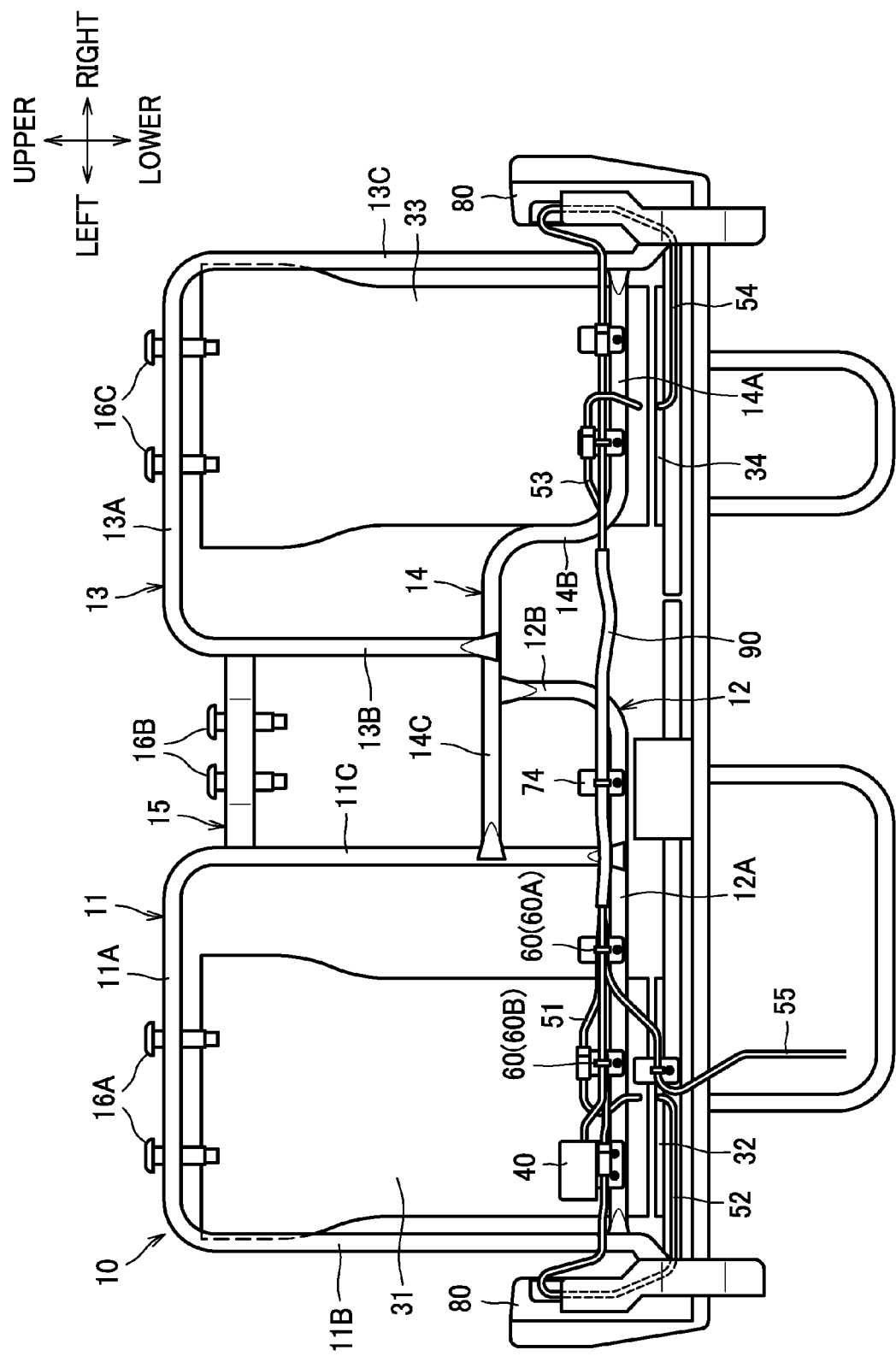
FIG. 2 is a rear view of a frame and electric wiring of the vehicle seat.

As shown in FIG. 2, the seat back frame 10 as an example of a first frame mainly includes a left upper frame 11, a left lower frame 12, a right upper frame 13, a right lower frame 14, and an upper connecting frame 15. The left upper frame 11, the left lower frame 12, the right upper frame 13, and the right lower frame 14 are made of metal pipe, while the upper connecting frame 15 are made of sheet metal. The seat back frame 10 is constructed by welding or otherwise joining the frames 11-15 together in one piece.

The left upper frame 11 includes a lateral pipe portion 11A extending laterally, a vertical pipe portion 11B extending from the left end of the lateral pipe portion 11A downward, and a vertical pipe portion 11C extending from the right end of the lateral pipe portion 11A downward. The left lower frame 12 includes a lateral pipe portion 12A, and a vertical pipe portion 12B extending from the right end of the lateral pipe portion 12A upward. The lateral pipe portion 12A connects the lower end portions of the left upper frame 11.

The right upper frame 13 includes a lateral pipe portion 13A, a vertical pipe portion 13B extending from the left end of the lateral pipe portion 13A downward, and a vertical pipe portion 13C extending from the right end of the lateral pipe portion 13A downward. The right lower frame 14 includes a lateral pipe portion 14A, a vertical pipe portion 14B extending from the left end of the lateral pipe portion 14A upward, and a lateral pipe portion 14C extending from the upper end of the vertical pipe portion 14B leftward. The right lower frame 14 connects the lower end portions of the right upper frame 13, and its left end is connected to the vertical pipe portion 11C of the left upper frame 11. The left lower frame 12 is connected to the lateral pipe portion 14C.

The upper connecting frame 15 is connected to the left upper frame 11 and to the right upper frame 13. Support brackets 16A, 16B, 16C for attachment of the headrests S13, S14, S23 are fixed to the lateral pipe portion 11A of the left upper frame 11, the upper connecting frame 15, and the lateral pipe portion 13A of the right upper frame 13, respectively.

The car seat S includes a control unit 40 configured to control each of the heaters 31-34, cables 51-54 arranged to connect the heaters 31-34 respectively to the control unit 40, and a cable 55 arranged to supply each heater 31-34 with electric power via the control unit 40.

Figure 3:
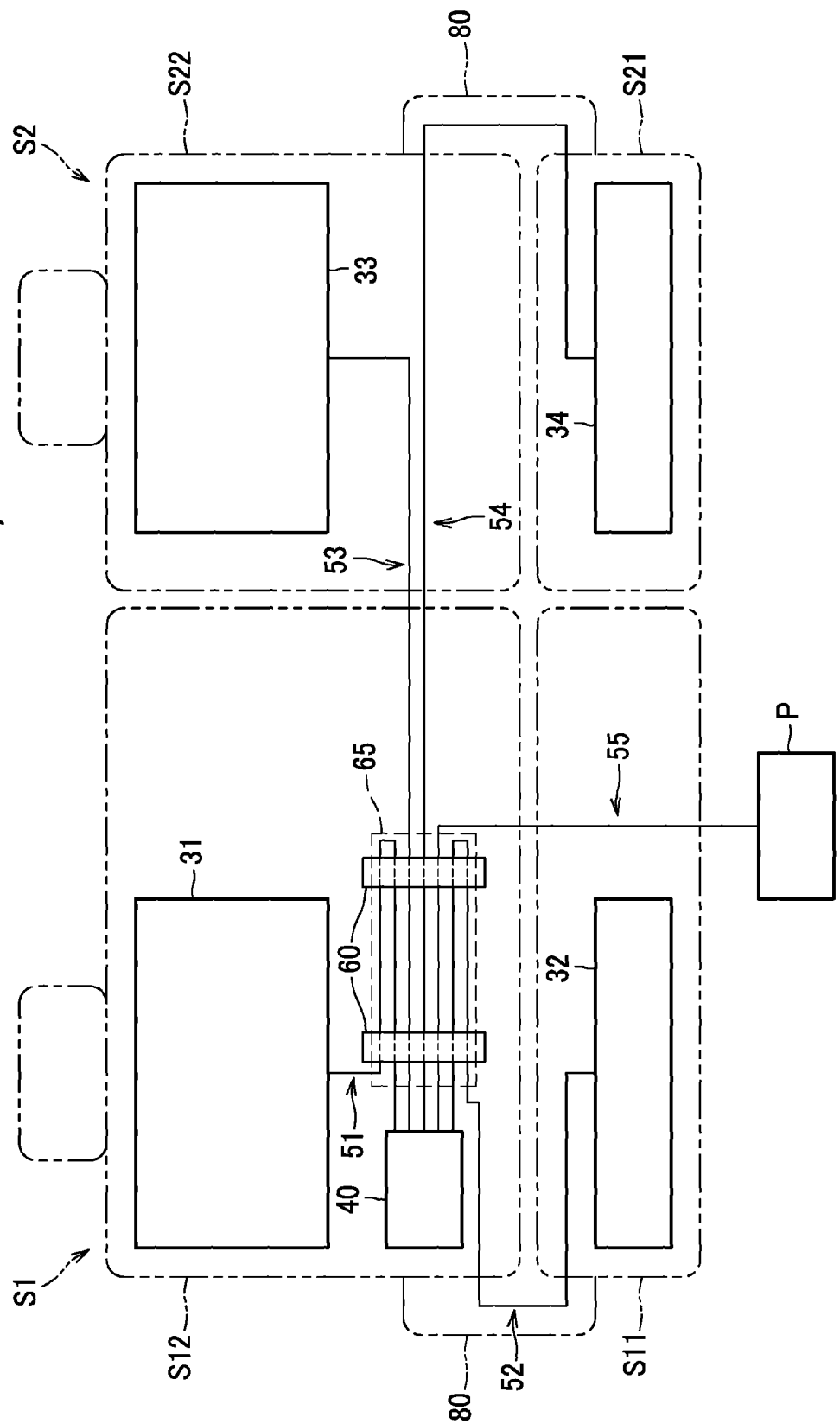
FIG. 3 is a schematic diagram showing the electric wiring in the first embodiment.

The electric wiring in the car seat S is schematically illustrated in FIG. 3. The cable 55 as an example of a power supply cable extends from the control unit 40 provided in the first seat S1, protrudes out of the car seat S, and is connected to a power supply unit P as an example of a power source provided in the car seat S.

The cable S1 is an example of a first electric wire that extends out from the control unit 40 and is connected to the left back heater 31 provided in the seat back S12. The cable 52 is an example of a second electric wire that extends out from the control unit 40 toward the seat cushion S11, and is connected to the left cushion heater 32 provided in the seat cushion S11.

The cable 53 is an example of a third electric wire that extends out from the control unit 40 provided in the first seat S1 toward the second seat S2, and is connected to the right back heater 33 provided in the seat back S22 of the second seat S2. The cable 54 is an example of a fourth electric wire that extends out from the control unit 40 provided in the first seat S1 toward the second seat S2, and is connected to the right cushion heater 34 provided in the seat cushion S21 of the second seat S2.

Figure 4:
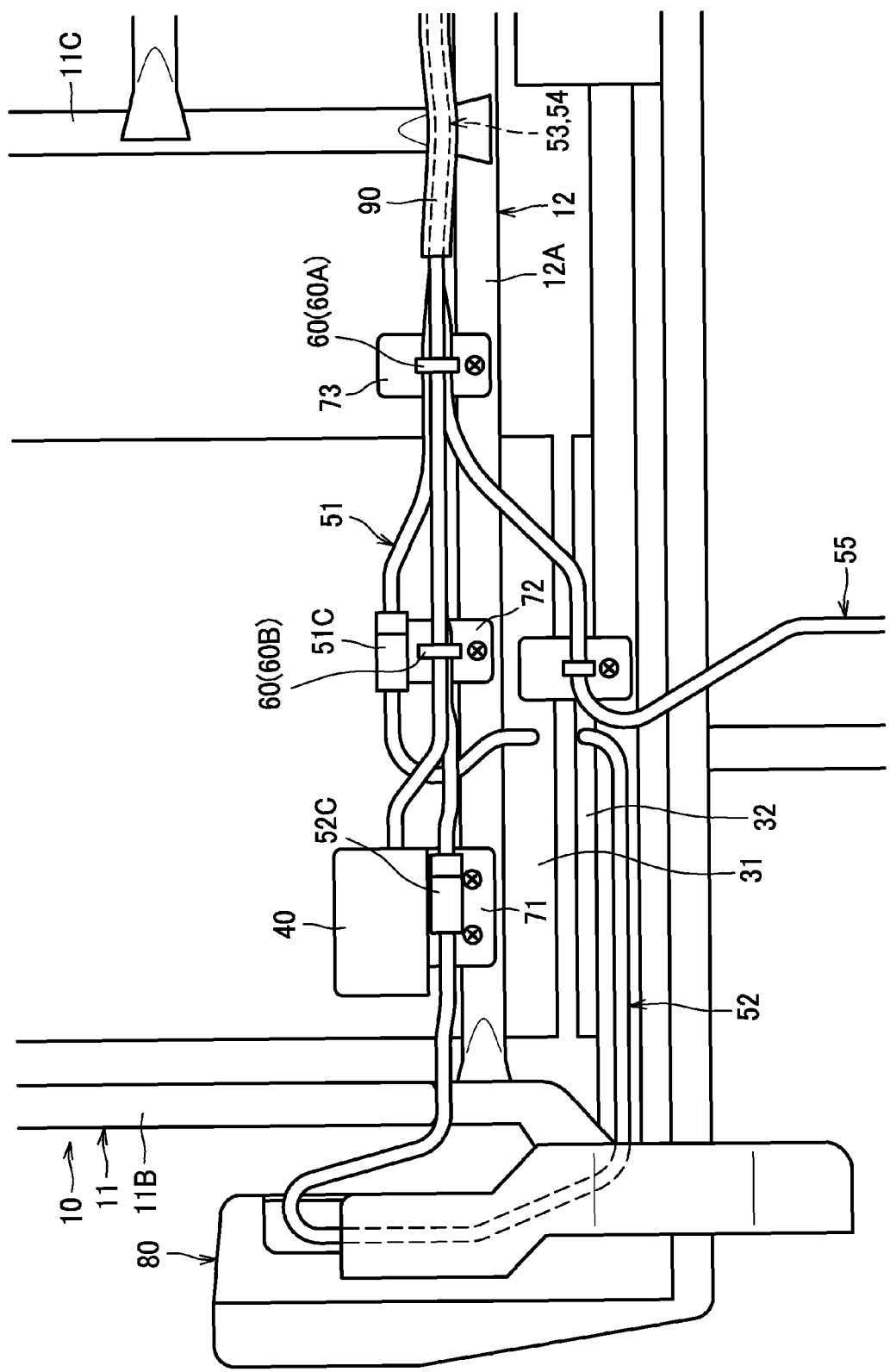
FIG. 4 is a rear view of a first seat for showing electric wiring installed in the first seat.

The control unit 40 is supplied with electric power by the power supply unit P (battery) installed in the car body as an example of a vehicle body. The control unit 40 is configured to regulate the output of each of the heaters 31-34. The control exercised by the control unit 40 over the heaters 31-34 are known in the art, and thus a detailed description of the method or process thereof is omitted herein. The control unit 40 is fixed to the seat back S12. To be more specific, as shown in FIG. 4, the control unit 40 is fixed to a plate-shaped first bracket 71, which is in turn attached to left end portion of the lateral pipe portion 12A of the left lower frame 12 by a screw or the like, so that the control unit 40 is fixed to the seat back frame 10.

The cables 51-55 are tied together by a tying pan 60A and a tying part 60B into a bundle 65. The cables 51-55 extend out from the bundle 65 leftward and are connected to the control unit 40 (see FIG. 3).

The tying part 60 (60A and 60B) are of harness clips by way of example. The tying part 60A with the cables 51-55 retained in the bundle 65 is fixed to a third bracket 73 shaped like a plate. The third bracket 73 is attached to a laterally central portion (at or around the center in the lateral direction) of the lateral pipe portion 12A of the seat back frame 10 by screws or the like. The tying part 60B with the cables 51-55 retained in the bundle 65 is fixed to a second bracket 72 shaped like a plate. The second bracket 72 is also attached to the lateral pipe portion 12A of the seat back frame 10 between the first bracket 71 and the third bracket 73 by screws or the like.

With this configuration, the tying part 60 is fixed to the seat back S12 via the bracket 72 and the bracket 73. To be more specific, the bundle 65 of the cables 51-55 tied by the tying part 60 is fixed to the seat back S12.

The cable 55 extends out from the bundle 65 through the tying part 60A in an obliquely-leftward-and-downward direction, and is routed under the vehicle seat S and connected to the power supply unit P provided in the car body (see FIG. 3).

The cable 51 extends out from the bundle 65 through the tying part 60A leftward, and is connected to the left back heater 31. A connector SIC is provided on a halfway point of the cable 51. The connector 51C is fixed to the second bracket 72. The connector 51C is configured to disconnectably connect segmented electric wires for convenience of routing of the cable 51.

The cable 52 extends out through the tying part 60A leftward, and is tied together with portions of the cables 51-55 extending toward the control unit 40 by the tying part 60B. The cable 52 extends out from the bundle 65 through the tying part 60B leftward, and further extends until it extends beyond an outer side, in the lateral direction, of the vertical pipe portion 11B of the seat back frame 10. The cable 52 extending on an inside of a cover member 80 is drawn out, at a position corresponding to the seat cushion S11 in the upward-downward direction, to an inner side of the cover member 80 in the lateral direction, and is connected to the left cushion heater 32. A connector 52C is provided on a halfway point of the cable 52. The connector 52C is fixed to the first bracket 71. The connector 52C is configured to disconnectably connect segmented electric wires for convenience of routing of the cable 52.

The cover member 80 is made of plastic. The cover member 80 is configured to cover a joint portion (e.g., a shaft on which the seat cushion S11 is allowed to turn relative to the seat back S12) of the seat cushion S11 and the seat back S12. Two cover members 80 are provided, of which left and right cover members 80 are provided respectively at the left and right sides of the lower-end portion of the seat back S12. The left and right cover members 80 are shaped and arranged substantially symmetric to each other, and thus the following description will refer only to the left cover member 80.

Figure 5A:
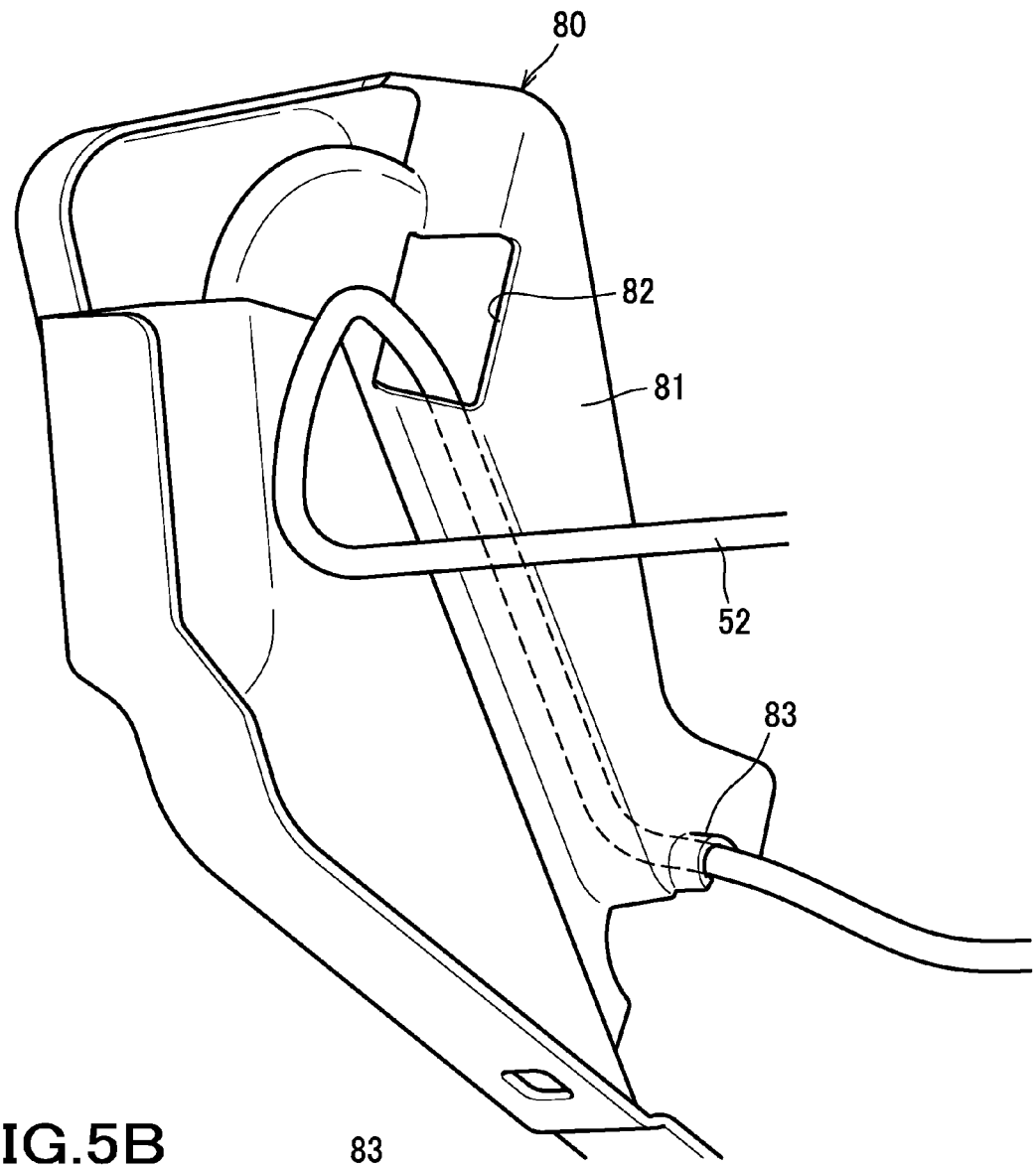
FIG. 5A is a perspective view of a cover member as viewed from the rear.

As shown in FIG. 5A, the cover member 80 mainly includes a cover body 81, an opening 82, and a protective portion 83. The cover body 81 is the main body of the cover member 80 and is configured to cover the shaft on which the seat cushion S11 is allowed to turn relative to the seat back S12. The opening 82 is a through hole through which the cable 52 is passed. The opening 82 is formed in an upper portion of the cover body 81.

Figure 5B:
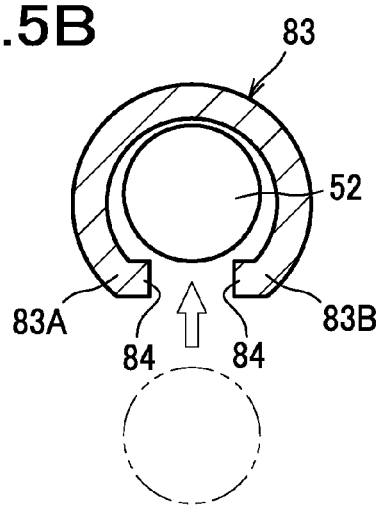
FIG. 5B is a cross-sectional view of a protective portion of the cover member.

The protective portion 83 is configured to protect the cable 52 extending out from the cover member 80. The protective portion 83 is formed in a lower portion of the cover body 81. To be more specific, the protective portion 83 protrudes out from a lower edge of a sidewall portion of the cover body 81 in a laterally inner direction, and extends along a portion of the cable 52 extending out from the lower edge of the cover body 81. As shown in FIG. 5B, the protective portion 83 is shaped to partially surround a peripheral surface of the portion of the cable 52 extending out from the lower edge of the cover body 81, like an inverted letter U in cross section, having an open side that opens substantially downward as viewed from a direction of extension of the protective portion 83, that is, the left or right (laterally inward) direction, at the lower edge of the cover body 81 in cross section taken along a plane perpendicular to a direction in which the protective portion 83 protrudes out. The protective portion 83 includes two projections 84 disposed at opposed end portions 83A, 83B of the open side of the protective portion 83. The two projections 84 project toward each other. The cable 52 extends along the inner peripheral surface of the protective portion 83 and out from the cover member 80.

As shown in FIG. 4, the cables 53, 54 extends out from the bundle 65 through the tying part 60A which is provided in the first seat S1, leftward toward the second seat S2. As shown in FIG. 2, portions of the cables 53, 54 extending out from the bundle 65 toward the second seat S2 (i.e., portions between the tying part 60A and the vertical pipe portion 14B of the seat back frame 10) are enclosed with a sheath 90.

The sheath 90 is a tubular member through which the cable 53 and the cable 54 are disposed inside. As shown in FIG. 2, the sheath 90 is held by a fourth bracket 74. The fourth bracket 74 is attached to a right end portion of the lateral pipe portion 12A of the seat back frame 10 by screws or the like. Accordingly, the sheath 90 is fixed to the seat back S12.

Figure 6:
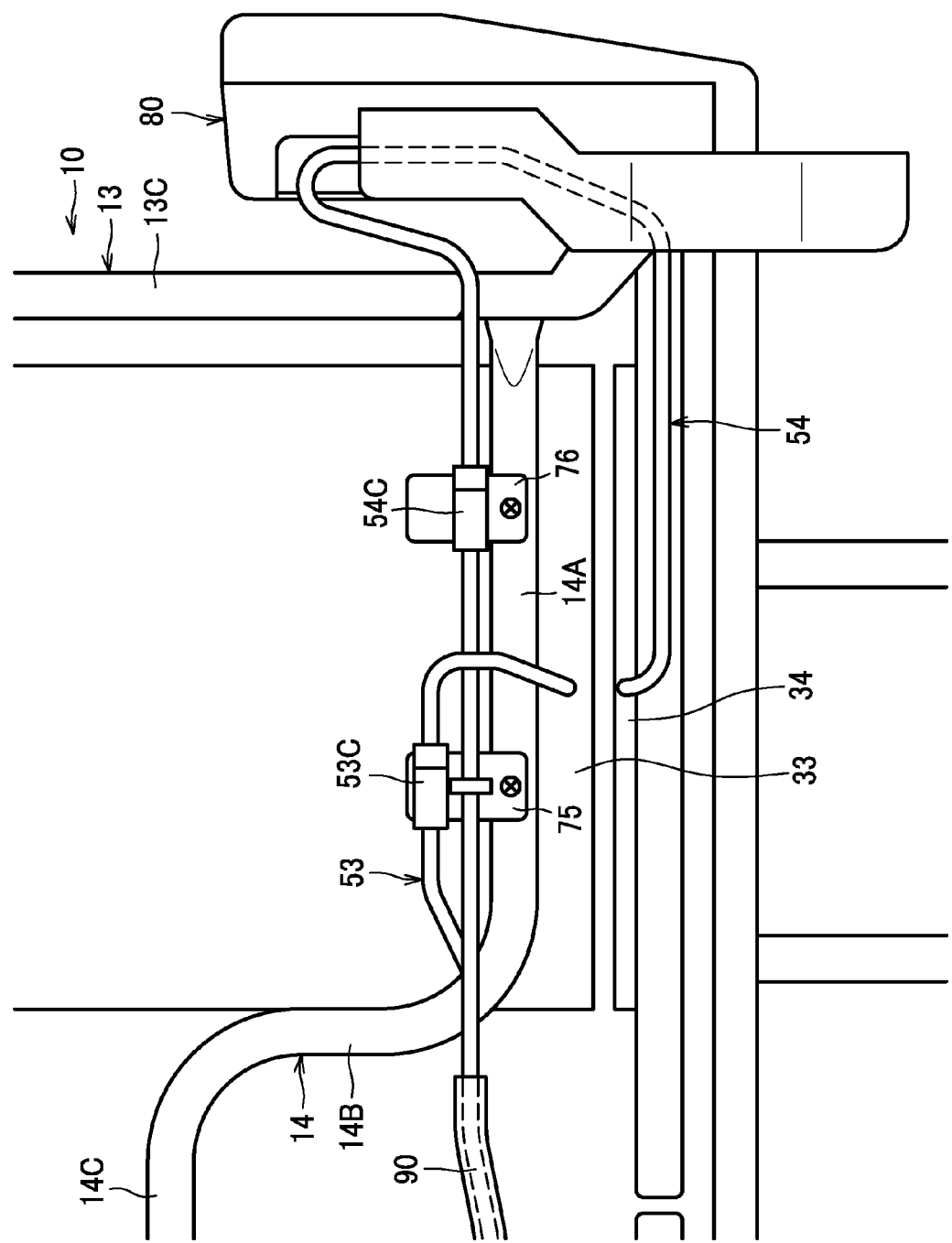
FIG. 6 is a rear view of a second seat for showing wiring installed in the second seat.

As shown in FIG. 6, the cable 53 extending out from the sheath 90 is connected to the right back heater 33. A connector 53C is provided on a halfway point of the cable 53, and the connector 53C is fixed to a fifth bracket 75. The connector 53C is configured to disconnectably connect segmented electric wires for convenience of routing of the cable 53.

The cable 54 extends out from the sheath 90 rightward, and further extends until it extends beyond an outer side, in the lateral direction, of the vertical pipe portion 13C of the seat back frame 10. The cable 54 extending on an inside of the cover member 80 is drawn out, at a position corresponding to the seat cushion S21 in the upward-downward direction, to an inner side of the cover member 80 through the protective portion 83 (see FIG. 5) in the lateral direction, and is connected to the right cushion heater 34. A connector 54C is provided on a halfway point of the cable 54. The connector 54C is fixed to a sixth bracket 76. The connector 54C is configured to disconnectably connect segmented electric wires for convenience of routing of the cable 54. The cable 54 is held by the fifth bracket 75 between the sheath 90 and the connector 54C. The fifth bracket 75 and the sixth bracket 76 are attached to the lateral pipe portion 14A of the seat back frame 10 by screws or the like.

In the present embodiment as described above, where the seat cushion S11 is allowed to move (turn) relative to the seat back S12, the following advantageous effects can be expected.

Since the tying part 60 by which the cables 51-55 are tied together into the bundle 65 is fixed to the seat back S12 that is not moved when the seat cushion S11 is moved, space for installing the cables 51-55 can be obtained relatively easily in comparison with an alternative configuration in which the tying part 60 is fixed to the seat cushion S11 (which could have less space for cable installation). Furthermore, the seat cushion S11 that may be operated to be moved can be made lightweight. Since the seat back S12 is not moved, the possibilities of any disadvantageous pulling, bending or pinching of the cables 51-55 can be avoided effectively. Accordingly, the cables 51-55 can be installed securely without suffering from any potential disadvantage that could be associated with the cables installed in the movable seat cushion S11.

Since the cable 55 arranged to supply the left back heater 31, the left cushion heater 32, the right back heater 33, and the right cushion heater 34 with electric power is also tied together with the cables 51-54 by the tying part 60 in the bundle 65, the cable 55 can be routed to extend out from the bundle 65 and connected to the power supply unit P installed in the car body. This not only makes installation of the cable 55 easier because the cables 51-55 can be handled together in the bundle 65, but also makes arrangement of the cable 55 desirable because the seat back S12 to which the cable 55 is fixed is not moved (thus, the cable 55 is not pulled) even when the seat cushion S11 is moved.

Since the control unit 40 configured to control the left back heater 31, the left cushion heater 32, the right back heater 33, and the right cushion heater 34 is fixed to the seat back S12, and the cables 51-55 are tied together by the tying part 60 into the bundle 65 which also is fixed to the seat back S12, the control unit 40 and the cables 51-55 can be fixed to the seat back S12 that is not moved even if the seat cushion S11 is moved. Therefore, the cables 51-55 extending out from the bundle 65 and connected to the control unit 40 can be installed in a desirable manner that serves to reduce the possibilities of undesirable pulling, bending or pinching of the cables 51-55 which could possibly be associated with an alternative configuration in which the control unit 40 is fixed to the movable seat cushion S11. Moreover, since the control unit 40 is fixed to the seat back S12 that is not moved even when the seat cushion S11 is moved, any impact given to the control unit 40 when the seat cushion S11 is moved can be considerably reduced in comparison with the alternative configuration in which the control unit 40 is fixed to the movable seat cushion S11. Furthermore, since the cables 51-55 and the control unit 50 are fixed to (provided in) the seat back S12 that is not moved when the seat cushion S11 is moved, the seat cushion S11 that may be operated to be moved can be made lightweight. Accordingly, the seat cushion S11 can be operated with increased ease.

Since the sheath 90 with which portions of the cables 53, 54 extending out from the bundle 65 fixed to the seat back S12 of the first seat S1 through the tying part 60A toward the second seat S2 are enclosed is provided, the portions of the cables 53, 54 enclosed with the sheath 90 can be handled as a single cable with ease. This advantageously makes the wiring configuration simple. In addition, the cables 53, 54 can be protected by the sheath 90.

Since the brackets 72, 73 to which the tying part 60 (tying parts 60A, 60B) is fixed are attached to the seat back frame 10 made of metal, the bundle 65 of the cables 51-55 tied together by the tying part 60 can be firmly fixed to the seat back S12.

With the cover member 80 including the cover body 81 and the protective portion 83, each cable 52, 54, in particular, the portion of the cable 52, 54 laid on the inside of the cover member 80 (cover body 81), can be protected. Moreover, the protective portion 83 protruding out from the edge of the cover body 81 and extending along the portion of the cable 52, 54 extending out from the edge of the cover body 81 serves to restrict a contact of the cable 52, 54 with the edge of the cover body 81 or a sharp bend thereof at the edge of the cover body 81 from which the cable 52, 54 protrudes out. Furthermore, since the protective portion 83 serves as a retainer to hold the cable 52, 54, no additional part for retaining the cables 52, 54 is necessitated, so that the number of parts can be reduced.

Since the protective portion 83 is shaped substantially like a letter U to partially surround the peripheral surface of the portion of the cable 52, 54 such that the protective portion 83 has an open side at the edge of the cover member 80 in cross section taken along a plane perpendicular to a direction in which the protective portion 83 protrudes out, the cable 52, 54 can be put through the open side into the protective portion 83 and retained therein. Accordingly, the cable 52, 54 can be arranged in a desired configuration more easily in comparison with an alternative configuration in which a protective portion is shaped like a tube having a closed cross section such that a cable should be threaded through the tubular protective portion.

Since the protective portion 83 includes two projections 84 disposed at opposed end portions 83A, 83B of the open side and projecting toward each other, a distance between the distal ends of the projections 84 can be made shorter than an outside diameter of the cable 52, 54, so that the cable 52, 54 fitted into the inside of the protective portion 83 can be caught and securely held by the projections 84 and made unlikely to come off the protective portion 83.

The car seat S described above is configured such that the seat backs S12, S22 are not allowed to move relative to the car body. However, the vehicle seat consistent with the present invention may alternatively be configured to allow the seat backs S12, S22 to be turned (tilted) relative to the vehicle seat to change the angle of the supporting surface. With this configuration, the seat cushions S11, S21 are configured to turn at an angle greater than the angle at which the seat backs S12, S22 may turn.

Next, a second embodiment will be described. In the following description, the same elements may be designated by the same reference numerals, and a duplicate description will be omitted.

Figure 7A:
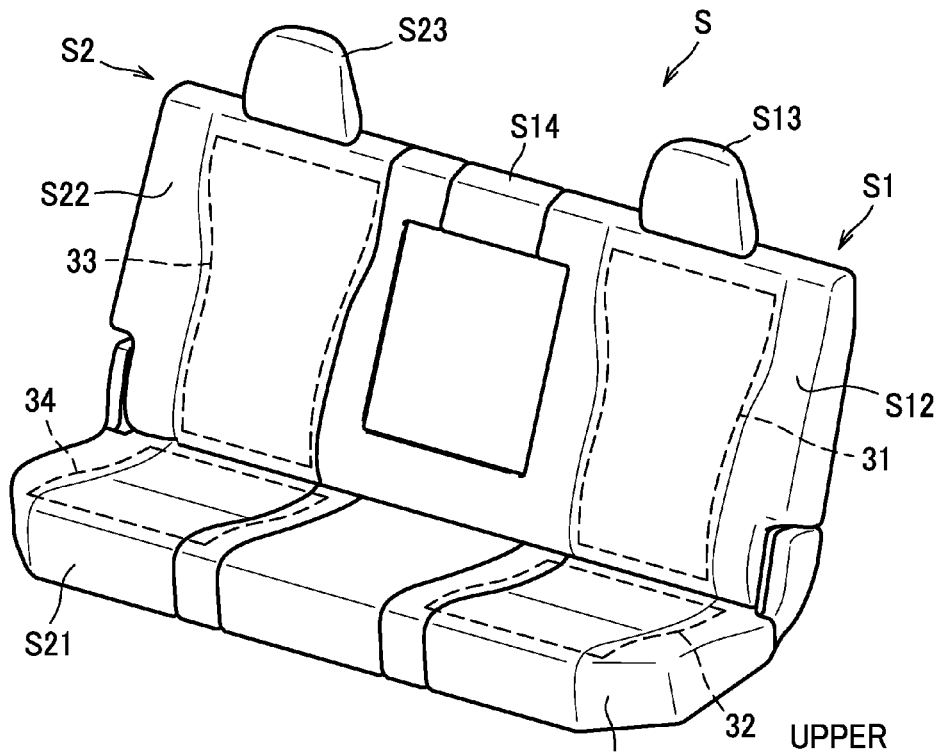
FIG. 7A is a perspective view of a vehicle seat according to a second embodiment.

As shown in FIG. 7A, a car seat S as a vehicle seat according to the present embodiment is configured to include a seat cushion S11 as a first member and a seat back S12 as a second member. In the present embodiment, the seat cushions S11, S21 are integrally provided in one piece, and the seat backs S12, S22 are provided as separate parts.

Figure 7B:
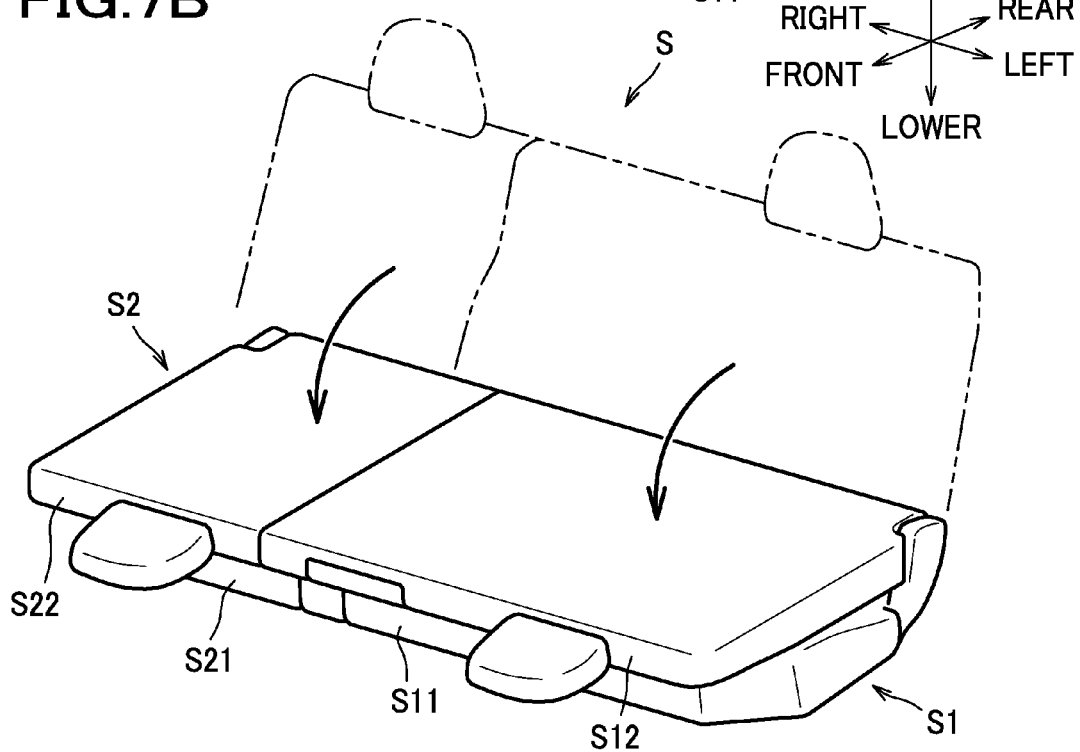
FIG. 7B is a perspective view of the vehicle seat of FIG. 7A in a state where a seat back has been tilted forward and folded down (moved relative to the seat cushion)

The car seat S in the present embodiment is configured to allow the seat back S12 to shift between a first state as shown in FIG. 7B in which an occupant's back-supporting surface thereof faces an occupant-sitting surface of the seat cushion S11 and a second state as shown in FIG. 7A in which the seat back S12 is farther from the seat cushion S11 than in the first state as a result of a turning motion thereof made relative the seat cushion S11. To be more specific, the seat back S12 is available for leaning purpose (i.e., an occupant can lean on the supporting surface of the seat back S12) in the second state as shown in FIG. 7A, and is forwardly tilted and folded down in the first state as shown in FIG. 7B. Similarly, the seat back S22 is available for leaning purpose (i.e., an occupant can lean on the supporting surface of the seat back S22) in a state as shown in FIG. 7A, and is forwardly tilted (turned relative to the seat cushion S21) and folded down in a state as shown in FIG. 7B.

As shown in FIG. 8, in the present embodiment, the tying part 60 with the cables 51-55 retained in the bundle 65 is fixed to the seat cushion S11 as the first member that is not moved even when the seat back S12 is moved. Therefore, the cables 51-55 can be installed securely without suffering any potential disadvantage that could be associated with the cables installed in the movable seat back S12.

In the present embodiment, the left cushion heater 32, the left back heater 31, the cable 52, and the cable 51 correspond, respectively, to "first electric device", "second electric device", "first electric wire", and "second electric wire" in the terminology of appended claims.

The car seat S described above according to the present embodiment is configured such that the seat cushions S11, S21 are not allowed to move relative to the car body. However, the vehicle seat consistent with the present invention may alternatively be configured to allow the seat cushions S11, S21 to be turned (tilted) relative to the vehicle body to change the angle of the occupant-sitting surface. With this configuration, the seat backs S12, S22 are configured to turn at an angle greater than the angle at which the seat cushions S11, S21 may turn.

Although some illustrative embodiments have been described above, the present invention is not limited to the above-described embodiments. Specific configurations may be changed or modified, where appropriate, without departing from the spirits of the present invention.

For example, the first member is the seat back S12 and the second member is the seat cushion S11 in the first embodiment, while the first member is the seat cushion S11 and the second member is the seat back S12. However, the specific examples of the first member and the second member are not limited thereto. For example, referring to FIG. 1A, an alternative configuration may be feasible in which the first member is the seat back S12 and the second member is an arm rest S15 that is allowed to turn relative to the seat back S12 between a retracted position and a use position. The first electric device provided in the seat back S12 as the first member may be the left back heater 31, and the second electric device provided in the arm rest S15 may be a control panel for operating an audio system, an air-conditioner, or the like, or a battery-charging system for charging a mobile phone or the like. In this configuration, the first electric wire connected to the first electric device and the second electric wire connected to the second electric device are tied together by the tying part into a bundle that is fixed to the seat back S12 that is not moved when the arm rest S15 is moved.

Although the protective portion 83 in the above embodiments includes two projections 84 projecting toward each other at opposed end portions 83A, 83B of the open side of the protective portion 83, an alternative configuration may be feasible in which only one projection projecting from one end portion toward the other end portion of the open side of the protective portion is provided. Another alternative configuration may also be feasible in which no projection is provided at the opposed end portions of the open side of the protective portion wherein the protective portion is shaped substantially like a letter C in cross section with a distance between the opposed end portions of the open side is short enough to prevent the cable from coming off the protective portion (i.e., moderately shorter than the outside diameter of the cable so as to allow the cable to be fitted inside the protective portion). Also, the protective portion without open side (i.e., shaped to completely surround the peripheral surface of the portion of the cable; e.g., tubular) may be used to enhance its features of protecting and retaining the cable protruding out from the cover member (cover body).

In the above-described embodiments, the cable 52 as the second electric wire only is disposed (routed) on the inside of the cover body 81 of the cover member 80, but the present invention is not limited to this arrangement. For example, the first electric wire only may be disposed on the inside of the cover body 81 of the cover member 80, or the both of the first electric wire and the second electric wire may be disposed on the inside of the cover body 81 of the cover member 80. Also, the vehicle seat consistent with the present invention may comprise no cover member.

In the above-described embodiments, the brackets 72, 73 to which the tying part 60 is fixed are attached to the seat back frame 10, but the brackets 72, 73 may be attached to other portions in the seat back S12, for example, to a plastic panel provided in the seat back S12. It is to be understood that the brackets 72, 73 may be omitted, that is, the tying part 60 may be attached directly to the seat back S12. The tying part 60 may not be limited to the illustrated harness clips. For example, tying band or the like may be used instead.

In the above-described embodiment, the connector 51C is provided on a halfway point of the cable 51, and the cable 51 is composed of segmented electric wires connected to each other by the connector SIC. However, the cable 51 may be composed of a single continuous electric wire with no connector interposed on a halfway point thereof. The same may apply to the other cables 52-54. Moreover, a connector may be provided on a halfway point of the cable 55.

In the above-described embodiments, the car seat S of bench type as used for the rearmost seat of a passenger automobile is illustrated as a vehicle seat, but any seat of independent type as used for the driver's seat or a passenger seat next to the driver's seat may be configured as consistent with the present invention. Although the car seat S as installed in an automobile is illustrated in the above-described embodiments, the present invention is not limited to the illustrated embodiments, and is also applicable to any other vehicle seat for use, for example, in railroad cars, ships and aircrafts, etc.

What is claimed is:

1. A vehicle seat comprising:
   a first member;
   a second member allowed to turn relative to the first member to thereby shift between a first state in which the second member faces the first member and a second state in which the second member is farther from the first member than in the first state;
   a first electric device provided in the first member;
   a second electric device provided in the second member;
   a first electric wire connected to the first electric device;
   a second electric wire connected to the second electric device;
   a tying part that ties the first electric wire and the second electric wire together into a bundle, wherein the tying part is fixed to the first member; and
   a cover member that includes a cover body configured to cover a shaft on which the second member is allowed to turn relative to the first member,
   wherein the second electric wire is partially laid in an interior of the cover body,
   wherein the cover member further includes a protective portion protruding out from the cover body and extending along a portion of the second electric wire extending out from the cover body, and
   wherein the second electric wire enters the cover body via an opening formed in an upper portion of the cover body, passes through the interior of the cover body and exits a lower portion of the cover body via the protective portion and is directed by the protective portion in a lateral direction of the vehicle seat.

2. The vehicle seat according to claim 1, further comprising a power supply cable arranged to supply the first electric device and the second electric device with electric power,
   wherein the power supply cable is tied together with the first electric wire and the second electric wire by the tying part in the bundle from which the power supply cable extends out and is connected to a power source provided in a vehicle body.

3. The vehicle seat according to claim 1, further comprising a control unit configured to control the first electric device and the second electric device,
   wherein the control unit is fixed to the first member, and
   wherein the first electric wire and the second electric wire extend out from the bundle and are connected to the control unit.

4. The vehicle seat according to claim 1, further comprising:
   a first seat and a second seat arranged side by side, the first seat comprising the first member and the second member;
   a third electric device provided in the second seat;
   a fourth electric device provided in the second seat;
   a third electric wire connected to the third electric device;
   a fourth electric wire connected to the fourth electric device, wherein the third electric wire and the fourth electric wire are tied together with the first electric wire and the second electric wire by the tying part; and
   a sheath with which portions of the third electric wire and the fourth electric wire extending out from the bundle toward the second seat are enclosed.

5. The vehicle seat according to claim 1, further comprising:
   a first frame provided in the first member; and
   a bracket to which the tying part is fixed,
   wherein the bracket is attached to the first frame.

6. The vehicle seat according to claim 1, wherein the protective portion is shaped to partially surround a peripheral surface of the portion of the second electric wire such that the protective portion has an open side at an edge of the cover member in cross section taken along a plane perpendicular to a direction in which the protective portion protrudes out.

7. The vehicle seat according to claim 6, wherein the protective portion includes a projection projecting from one end portion of the open side toward another end portion of the open side.

8. The vehicle seat according to claim 1, wherein the first member includes a seat back, and
   wherein the second member includes a seat cushion that is available for seating purpose in the second state and is tipped up in the first state.

9. The vehicle seat according to claim 1, wherein the first member includes a seat cushion, and
   wherein the second member includes a seat back that is available for leaning purpose in the second state and is forwardly folded down in the first state.

10. The vehicle seat according to claim 1, wherein the protective portion is formed in a lower portion of the cover body, the protective portion directing the second electric wire out from the interior of the cover body.

* * * * *